United States Patent [19]

Kobayashi

[11] Patent Number: 5,066,268
[45] Date of Patent: Nov. 19, 1991

[54] TORQUE DISTRIBUTION CONTROL SYSTEM FOR A FOUR-WHEEL DRIVE MOTOR VEHICLE

[75] Inventor: Toshio Kobayashi, Tokyo, Japan
[73] Assignee: Fuji Jukogyo Kabushiki Kaisha, Tokyo, Japan
[21] Appl. No.: 485,092
[22] Filed: Feb. 23, 1990

[30] Foreign Application Priority Data

Feb. 28, 1989 [JP] Japan .................................. 1-048150
Jun. 30, 1989 [JP] Japan .................................. 1-170895

[51] Int. Cl.$^5$ ............................................. F16H 1/42
[52] U.S. Cl. ................................... 475/249; 180/248; 180/249
[58] Field of Search ................................ 180/248, 249; 192/103 F; 475/84, 86, 87, 89, 91, 118, 121-123, 125, 225, 248, 249, 257

[56] References Cited

U.S. PATENT DOCUMENTS

| | | | |
|---|---|---|---|
| 4,466,502 | 8/1984 | Sakai | 180/248 |
| 4,481,877 | 11/1984 | Takano et al. | 192/32 X |
| 4,691,593 | 9/1987 | Mueller | 180/249 X |
| 4,702,341 | 10/1987 | Taga et al. | 180/249 |
| 4,744,437 | 5/1988 | Matsumoto | 180/249 |
| 4,779,487 | 10/1988 | Pitsch et al. | 180/249 X |
| 4,882,950 | 11/1989 | Gausrab et al. | 180/248 X |
| 4,884,650 | 12/1989 | Fujiki et al. | 180/248 X |

FOREIGN PATENT DOCUMENTS

63-176728 7/1988 Japan .

Primary Examiner—Leslie A. Braun
Assistant Examiner—Benjamin Levi
Attorney, Agent, or Firm—Martin A. Farber

[57] ABSTRACT

A system for controlling torque distributed to front wheels and rear wheels of a motor vehicle. A planetary gear device including a first sun gear connected to an output shaft of a manual transmission, first and second planet pinions integral with each other, a carrier provided to rotatably support the pinions and operatively connected to the front wheels, and a second sun gear operatively connected to the rear wheels is disposed to distribute the torque to front wheels and rear wheels. The first planetary pinion is engaged with the first sun gear, and the second planetary pinion is engaged with the second sun gear. A fluid operated multiple-disk clutch selectively connects two of the first sun gear, the carrier and the second sun gear so as to restrict the differential operation of the planetary gear device.

2 Claims, 8 Drawing Sheets

TORQUE DISTRIBUTION CONTROL SYSTEM FOR A FOUR-WHEEL DRIVE MOTOR VEHICLE

BACKGROUND OF THE INVENTION

The present invention relates to a torque distribution control system for a four-wheel drive motor vehicle having a central differential.

In a four-wheel drive motor vehicle, a torque distribution ratio of front wheels and rear wheels is determined to coincide with a dynamic weight ratio of the front and rear wheels rather than a static weight ratio thereof, so that the power of the engine may be most effectively used at acceleration.

In a four-wheel drive motor vehicle based on a front-wheel drive vehicle with a front-mounted engine, which has the static weight ratio of 60(front):40(rear), the ratio of front torque $T_F$ to front wheels and rear torque $T_R$ to rear wheels is determined in the ratio of 50:50 which is the same as the dynamic weight ratio thereof. In a four-wheel drive motor vehicle based on a rear-wheel drive vehicle with a front-mounted engine, which has the static weight ratio of 50:50, the ratio of the front torque $T_F$ and the rear torque $T_R$ is determined in the same ratio of 40:60 as the dynamic weight ratio. Accordingly, a central differential comprising bevel gears is employed in the former vehicle in which the output torque of the engine is equally distributed, and a central differential having a simple planetary gear device is employed in the latter vehicle.

The former vehicle ensures safe driving on a slippery road. If a differential lock device is provided for locking the central differential, the driving force of the vehicle is improved. However, when the vehicle makes a turn at high speed under the differential lock condition, all of the four wheels may slip (i.e. the vehicle spins) at the same time, causing difficulty in driving.

In order to ensure a driving stability of the vehicle, the torque to the rear wheels is set to a value larger than that to the front wheels by arranging the central differential comprising the simple planetary gear device, so that rear wheels may slip first. Thus, the vehicle can be safely driven because a driver immediately notices the slipping of the rear wheels before all of the four wheels slip at the same time.

Japanese Patent Application Laid-Open 63-176728 discloses a four-wheel drive motor vehicle in which a central differential comprising a simple planetary gear device is provided. The output of a transmission is transmitted to a carrier of the planetary gear device. The torque is distributed to the front wheels through either a sun gear or a ring gear and to the rear wheels through the other gear. The torque to the front and rear wheels is unequally distributed at the ratio determined by the ratio of the pitch circles of the sun gear and the ring gear. The torque distribution ratio can not be changed with the large degree of freedom. Furthermore, it is difficult to change the diameters of the sun gear and the ring gear because of limitation of space in the transmission.

Further, in a power transmitting system having a transaxle type of a manual transmission, the central differential must be disposed in a space adjacent to a transfer shaft at the rear of the transmission so as not to reduce a minimum ground clearance and the space in the vehicle. Therefore, it is improper to use the central differential with the simple planetary gear device, because the diameters of the sun gears and ring gears and the torque distribution ratio can not be increased. Moreover, if a fluid operated multiple-disk friction clutch as a lock device is provided for controlling the differential operation, the distribution of torque to the rear wheels can not be set to a large value, so that the control range of the multiple-disk friction clutch becomes small. Consequently, a motor vehicle having good driveability and controllability of handling can not be provided.

SUMMARY OF THE INVENTION

An object of the present invention is to provide a torque distribution control system for a four-wheel drive motor vehicle in which the torque ratio of the front wheels and rear wheels can be easily changed.

Another object of the invention is to provide a system in which a large torque is distributed to rear wheels, thereby enabling the control of a wide torque distribution range with a fluid operated friction clutch.

According to the present invention, there is provided a system for controlling torque distribution to front wheels and rear wheels of a motor vehicle having a manual transmission having an output shaft, comprising a planetary gear device including a first sun gear connected to the output shaft of the transmission, first and second planetary pinions integral with each other, a carrier provided to rotatably support the pinions and operatively connected to the front wheels, and a second sun gear operatively connected to the rear wheels, the first planetary pinion being engaged with the first sun gear, and the second planetary pinion being engaged with the second sun gear, and means for selectively connecting two of the first sun gear, the carrier and the second sun gear of the planetary gear device so as to restrict the differential operations of the planetary gear device wherein said means selectively connects the carrier and the first sun gear or the first and second sun gears.

The other objects and features of this invention will become understood from the following description with reference to the accompanying drawings.

DETAILED DESCRIPTION OF THE PREFERRED EMBODIMENTS

Figure 1:
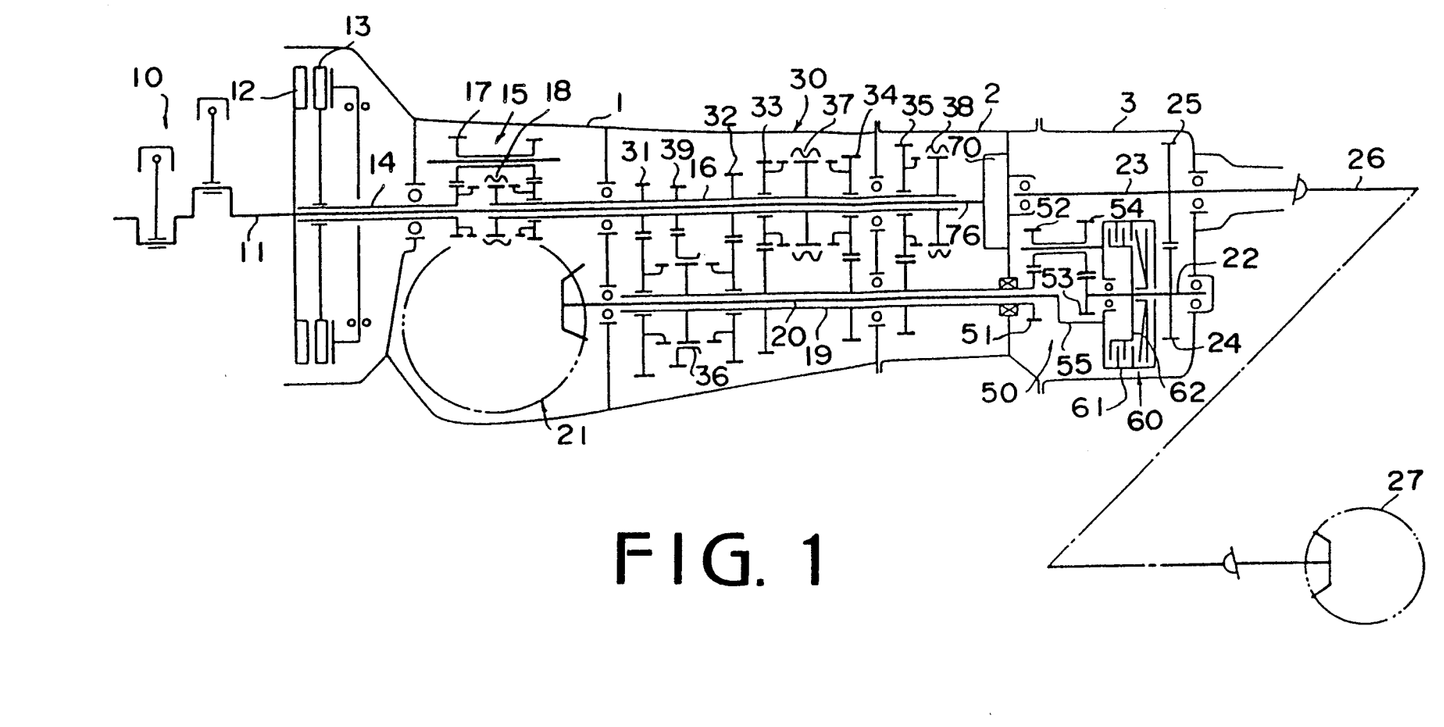
FIG. 1 is a schematic diagram showing a power transmission system for a four-wheel drive motor vehicle according to the present invention.

FIG. 1 shows a power transmission system of a transaxle type for a four-wheel drive motor vehicle having an engine 10 at a front portion thereof. The power transmission system is housed in a transmission case 1 and a transfer case 2 attached to the rear end of the transmission case 1. A crankshaft 11 of the engine 10 is connected to a clutch 13 through a flywheel 12. The clutch 13 is connected to a sub transmission 15 through a drive shaft 14. The sub transmission 15 has reduction gears 17 disposed between the drive shaft 14 and an input shaft 16, and a selector mechanism 18. The sub transmission 15 is adapted to selectively operate to directly engage the drive shaft 14 with the input shaft 16 for providing a high speed range and to engage the drive shaft 14 with the input shaft 16 bypassing the reduction gears 17 for providing a low speed range.

A main manual transmission 30 connected to the input shaft 16 has a tubular output shaft 19 parallel with the input shaft 16, five pairs of change-speed gears 31 to 35 corresponding to first to fifth speed gears, synchronizers 36 to 38, and a reverse drive gear 39 engaged with the synchronizer 36 for reverse drive. A front drive shaft 20 is rotatably supported in the output shaft 19. The output shaft 19 is rearwardly extended to an extension case 3 attached to the transfer case 2 and connected to a central differential 50 housed therein. The central differential 50 is connected to the front drive shaft 20 which is connected to a front differential 21 provided under the sub transmission 15 so as to transmit the power to front wheels of the vehicle.

The central differential 50 is further connected to a transfer shaft 22 disposed in alignment with the front drive shaft 20. The transfer shaft 22 is connected to a rear drive shaft 23 through transfer gears 24 and 25. The rear drive shaft 23 is disposed in parallel with the front drive shaft 20. The rear drive shaft 23 is connected to rear wheels of the vehicle through a propeller shaft 26 and a rear differential 27. A fluid operated multiple-disk friction clutch 60 is provided in the central differential 50.

Figure 2A:
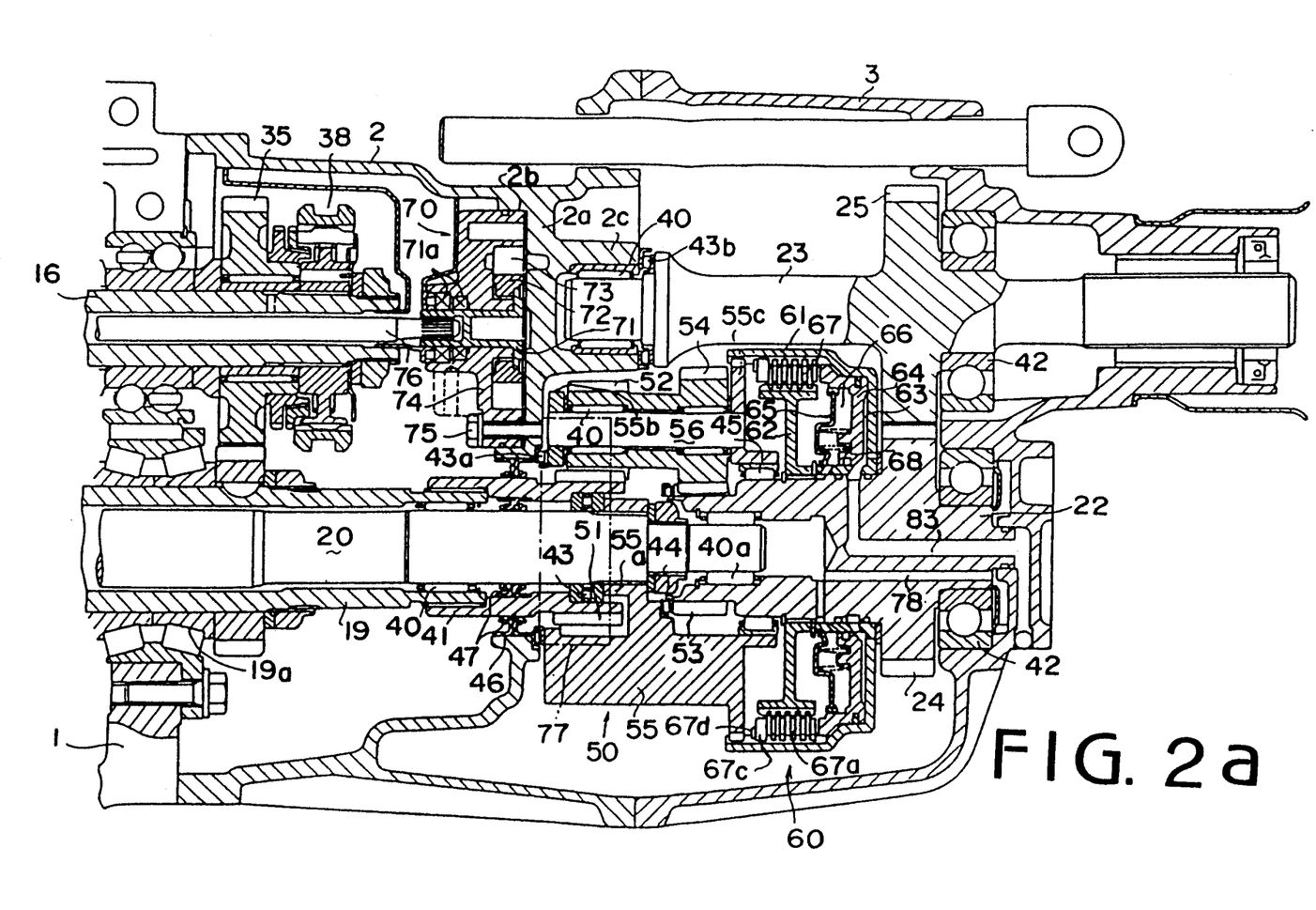
FIG. 2a is an enlarged sectional view showing a central differential of the system.

Referring to FIG. 2a showing the central differential 50, the rear end of the output shaft 19 is rotatably supported in the transmission case 1 through a taper roller bearing 19a. A drive gear shaft 41 is splined to the output shaft 19. The front drive shaft 20 is rotatably mounted in the output shaft 19 through a needle bearing 40. The rear end of the front drive shaft 20 is rotatably mounted in the transfer shaft 22 through a needle bearing 40a. The transfer shaft 22 is supported in the extension case 3 through a ball bearing 42. The central differential 50 is disposed among the drive gear shaft 41 connected with the output shaft 19, front drive shaft 20 and transfer shaft 22.

The central differential 50 is a complex planetary gear device and comprises a first sun gear 51 integrally formed on the drive gear shaft 41, a first planet pinion 52 meshed with the first sun gear 51, a second sun gear 53 integrally formed on the transfer shaft 22, a second planetary pinion 54 meshed with the second sun gear 53 and secured to the first planet pinion 52, and a carrier 55.

Figure 2B:
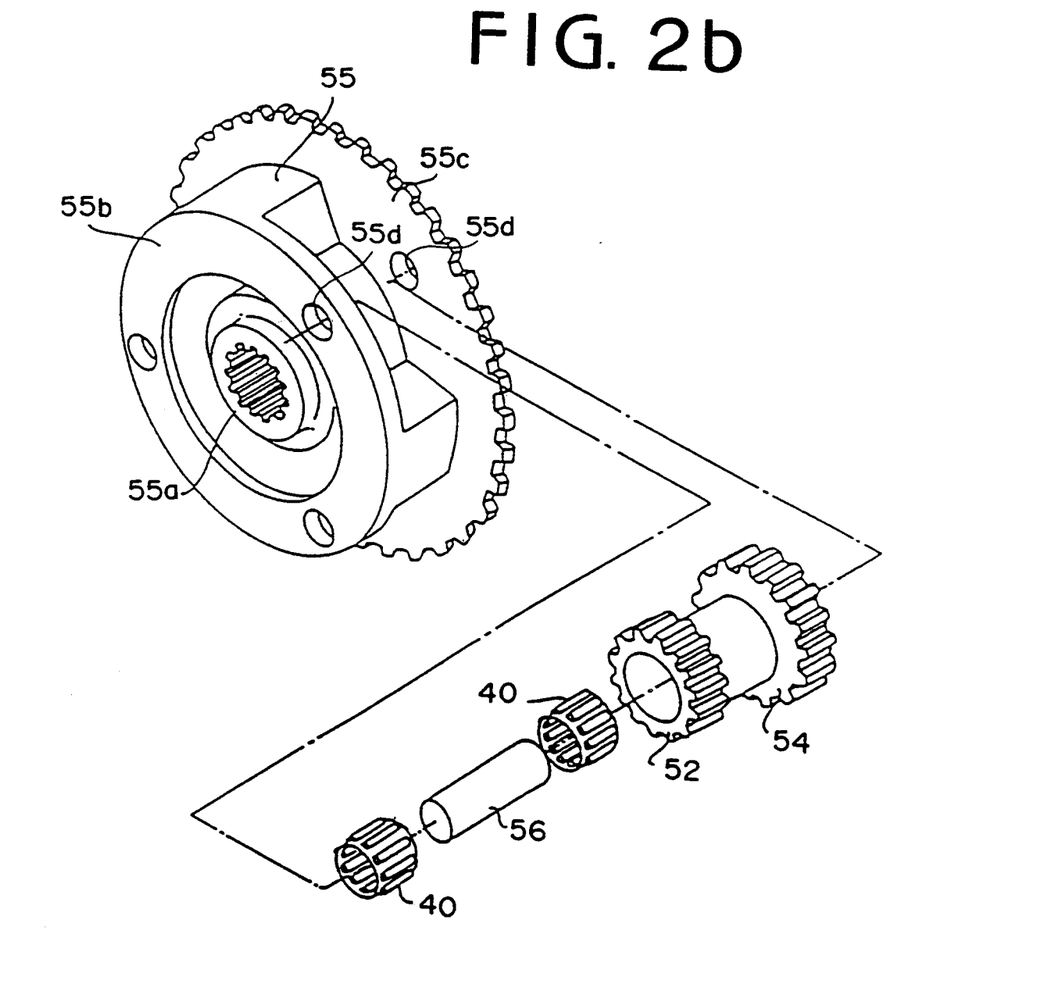
FIG. 2b is a perspective view showing a carrier and pinions provided in the central differential.

Referring to FIG. 2b, the carrier 55 has a boss 55a, an annular flange portion 55b and a toothed flange 55c opposite to the flange portion 55b. The flange portion 55b and the toothed flange 55c are integrated with the boss 55a. The flange portion 55b and the toothed flange 55c have holes 55d corresponding to each other for supporting a pin 56. The boss 55a is mounted on the drive gear shaft 41 through a thrust bearing 43 and splined to the front drive shaft 20 and secured thereto by a lock nut 44. The flange portion 55b is mounted on a partition 2a of the transfer case 2 through a thrust bearing 43a and the toothed flange 55c is rotatably mounted on the transfer shaft 22 through a bearing 45.

Thus, the output torque from the output shaft 19 of the transmission 30 is transmitted to the carrier 55 and the second sun gear 53 through the first sun gear 51 and pinions 52, 54 at predetermined respective torque distribution ratios. The difference between rotating speeds of the carrier 55 and the second sun gear 53 is absorbed by the rotation and revolution of first and second planetary pinions 52 and 54.

Figure 3:
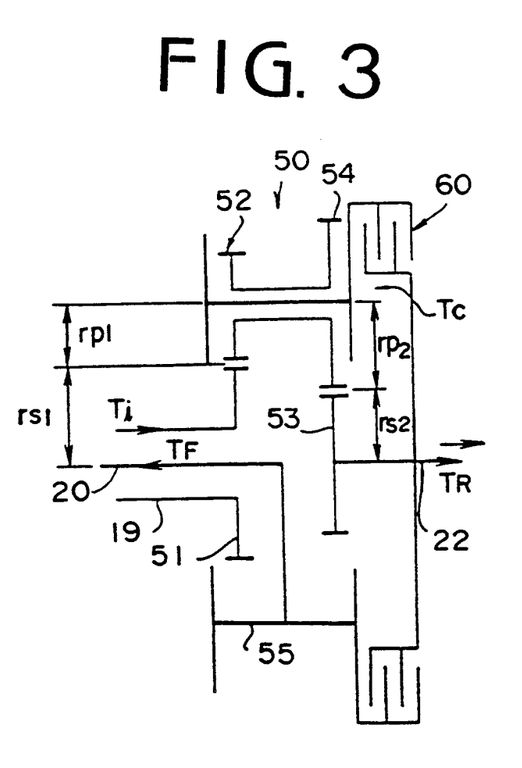
FIG. 3 is a schematic view showing the central differential.

The operation of the central differential 50 for distributing the torque to front wheels and rear wheels will be described hereinafter with reference to FIG. 3.

Input torque Ti of the first sun gear 51 and the relationship between the sun gears and the pinions are expressed as follows, respectively.

$$Ti = T_F + T_R \tag{1}$$

$$rs_1 + rp_1 = rs_2 + rp_2 \tag{2}$$

where $T_F$ is the front torque transmitted from the carrier 55 to the front drive shaft 20, $T_R$ is the rear torque transmitted from the second sun gear 53 to the rear drive shaft 23 through the transfer shaft 22 and transfer gears 24 and 25, $rs_1$ is the radius of the pitch circle of the first sun gear 51, $rp_1$ and $rp_2$ are radii of pitch circles of first and second pinions 52 and 54, respectively, and $rs_2$ is the radius of the pitch circle of the second sun gear 53.

A tangential load P on the engaging point of the first sun gear 51 and the first pinion 52 is equal to the sum of a tangential load $P_1$ on the carrier 55 and a tengential load $P_2$ on the engaging point of the second sun gear 53 and the second pinion 54. That is, $$P = Ti/rs_1$$

$$P_1 = T_F/(rs_1 + rp_1)$$

$$P_2 = T_R/rs_2$$

$$Ti/rs_1 = \{(T_F/(rs_1 + rp_1)\} + T_R/rs_2 \tag{3}$$

Substituting equations (1) and (2) for the equation (3), $$T_F = (1 - rp_1 \cdot rs_2/rs_1 \cdot rp_2) \cdot Ti$$

$$T_R = (rp_1 \cdot rs_2/rs_1 \cdot rp_2) \cdot Ti$$

Consequently, it will be seen that the torque distribution for the front torque $T_F$ and the rear torque $T_R$ can be set to various values by changing the radii of the pitch circles of sun gears 51 and 53 and the pinions 52 and 54.

If $rs_1$ is 23.5 mm, $rp_1$ is 16.5 mm, $rp_2$ is 18.8 mm and $rs_2$ is 21.1 mm, the front torque $T_F$ and the rear torque $T_R$ are calculated as $$T_F = 20/53 \cdot Ti$$

$$T_R = 33/53 \cdot Ti$$

Thus, the torque distribution ratio of the front wheels and the rear wheels is $$T_F{:}T_R \approx 38{:}62$$

A large torque can be distributed to the rear wheels.

The clutch 60 comprises a drive drum 61 splined to the toothed flange 55c of the carrier 55, a driven drum 62 splined to the transfer shaft 22 integral with the second sun gear 53, a plurality of disks 67a splined on the drum 61, and a plurality of disks 67 splined on the drum 62, alternately arranged. A retainer 67c is abutted on the innermost disk 67a by a snap ring 67d secured to the drum 61. A piston 64 is provided in the drum 61 and slidably mounted on a hub of the drum 62. An oil chamber 63 is formed between the piston 64 and the drum 61. Thus, the clutch 60 is provided between the carrier 55 and the second sun gear 53 so as to change the torque distribution ratio and to lock the central differential 50.

When oil is supplied to the chamber 63, the piston 64 is pushed by the pressure of the oil. The piston 64 pushes the disks 67 and 67a to engage the clutch 60 for producing a clutch torque.

A cylindrical retainer 65 is disposed in a space between the piston 64 and the driven drum 62. The retainer 65 is mounted on the hub of the drum 62 and slidably engaged with an inner periphery of the piston 64. Thus, the retainer 65 is watertightly mounted between the drum 62 and the piston 64, thereby defining a centrifugal oil pressure chamber 66 having a large volume, opposite to the oil chamber 63. A return coil spring 68 is provided in the chamber 66 between the piston 64 and the retainer 65.

The oil for the transmission 30 is different from the oil for the clutch 60. Thus, oil seals 47 are disposed between the partition 2a of the transfer case 2 and the drive gear shaft 41 and between the front drive shaft 20 and the drive gear shaft 41 at an opening 46 formed in the partition 2a for the drive gear shaft 41 and the front drive shaft 20, to separate the oil for lubricating the transmission 30 from the oil for operating the clutch 60 by the partition 2a.

An oil pump 70 is provided on the partition 2a for supplying the oil to the clutch 60. The oil pump 70 comprises a pump housing 74 mounted in a recess 2b formed on the partition 2a and secured to the partition 2a by bolts 75. In the pump housing 74, a drive plate 71, an inner rotor 72 engaged with the drive plate 71 and an outer rotor 73 are provided. A pump drive shaft 76 connected to the crankshaft 11 is mounted in the drive shaft 14 and the input shaft 16. The rear end of the pump drive shaft 76 is operatively connected to the drive plate 71.

Oil seals 71a are disposed between the pump housing 74 and the drive plate 71 so as to prevent mixing of oil with the oil for the transmission 30.

An oil pressure control unit 77 is provided on the partition 2a for controlling the clutch 60. An oil passage 83 and a lubricating oil passage 78 are formed in the transfer shaft 22. Oil in the control unit 77 is supplied to the oil chamber 63 through the passage 83 and to the centrifugal oil pressure chamber 66 and bearings through the passage 78.

The rear drive shaft 23 is supported in a boss 2c of the partition 2a through a needle bearing 40 and a thrust bearing 43b at the front end thereof and supported in the extension case 3 through a ball bearing 42.

Figure 4:
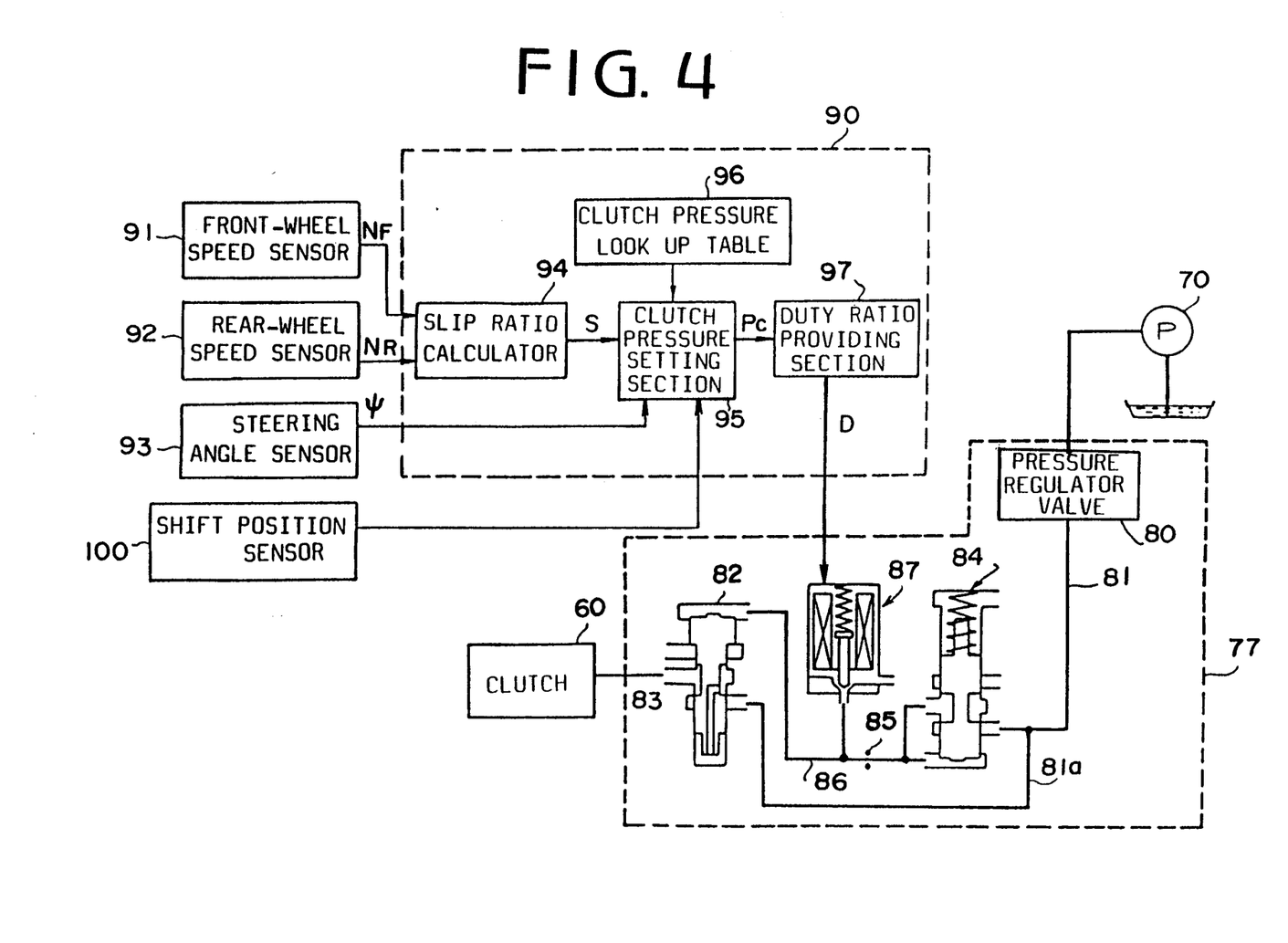
FIG. 4 is a circuit showing a control system for a hydraulic clutch provided in the central differential.

Referring to FIG. 4 showing a control system for the clutch 60, the oil pressure control unit 77 of the control system comprises a pressure regulator valve 80, a pilot valve 84, a clutch control valve 82 and a solenoid operated duty control valve 87. The regulator valve 80 operates to regulate the pressure of oil supplied from the oil pump 70 driven by the engine to produce a predetermined line pressure and a lubricating oil pressure. An actuating pressure conduit 81 is communicated with a passage 86 through the pilot valve 84. The passage 86 is communicated with the solenoid operated duty control valve 87 downstream of an orifice 85, and with an end port of the clutch control valve 82. The conduit 81 is communicated with the clutch control valve 82 through a passage 81a. The clutch control valve 82 is communicated with the clutch 60 through the passage 83. The solenoid operated valve 87 is operated by pulses from a control unit 90 at a duty ratio determined therein, so as to control draining the oil to provide a control pressure. The control pressure is applied to an end of a spool of the clutch control valve 82 to control an oil pressure applied to the clutch 60 through the passage 83 so as to control the clutch pressure (torque).

The control unit 90 is supplied with an output signal from a front-wheel speed sensor 91, a rear-wheel speed sensor 92, a steering angle sensor 93 and a shift position sensor 100 for detecting the shift position of the manual transmission 30.

The control unit 90 has a slip ratio calculator 94 to which front-wheel and rear-wheel speeds $N_F$ and $N_R$ are applied. Since the torque distribution is determined in accordance with the principle of $T_F < T_R$, first the rear wheels slip. A slip ratio S is calculated in accordance with the ratio of the front-wheel speed $N_F$ to the rear-wheel speed $N_R$, i.e. $S = N_F/N_R (S > 0)$. The slip ratio S, a steering angle $\psi$, a throttle opening degree signal, a vehicle speed signal and a shift position signal from the sensors 93 and 100 are applied to a clutch pressure setting section 95. In accordance with the input signals, the clutch pressure setting section 95 retrieves a clutch pressure Pc from a clutch pressure look up table 96.

Figure 5:
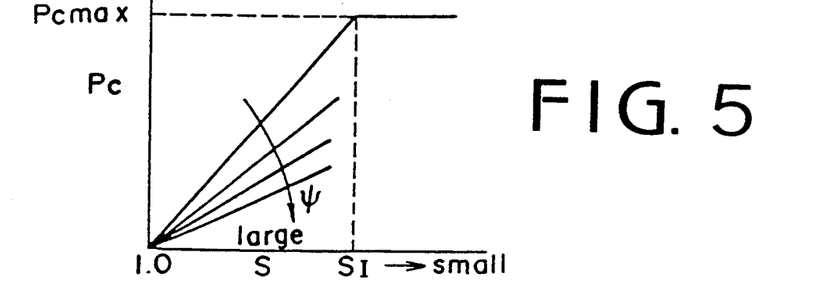
FIG. 5 is a graph showing a clutch pressure look-up table.

FIG. 5 shows clutch pressures stored in the look up table 96. When the slip ratio S is $S \geq 1$, which means that the rear wheels do not slip, the clutch pressure Pc is set to a small value. When the rear wheels slip and the slip ratio S becomes $S < 1$, the clutch pressure Pc (clutch torque) increases with a decrease of the slip ratio S. When the slip ratio S becomes smaller than a set value SI, the clutch pressure Pc is set to a maximum Pcmax. Further, when the steering angle $\psi$ increases, the clutch pressure Pc is decreased, thereby preventing the tight corner braking phenomena.

The clutch pressure Pc is applied to a duty ratio providing section 97 where a duty ratio D corresponding to the derived clutch pressure Pc is provided. A duty signal with a duty ratio D provided at the section 97 is applied to the solenoid operated duty control valve 87.

Figure 7:
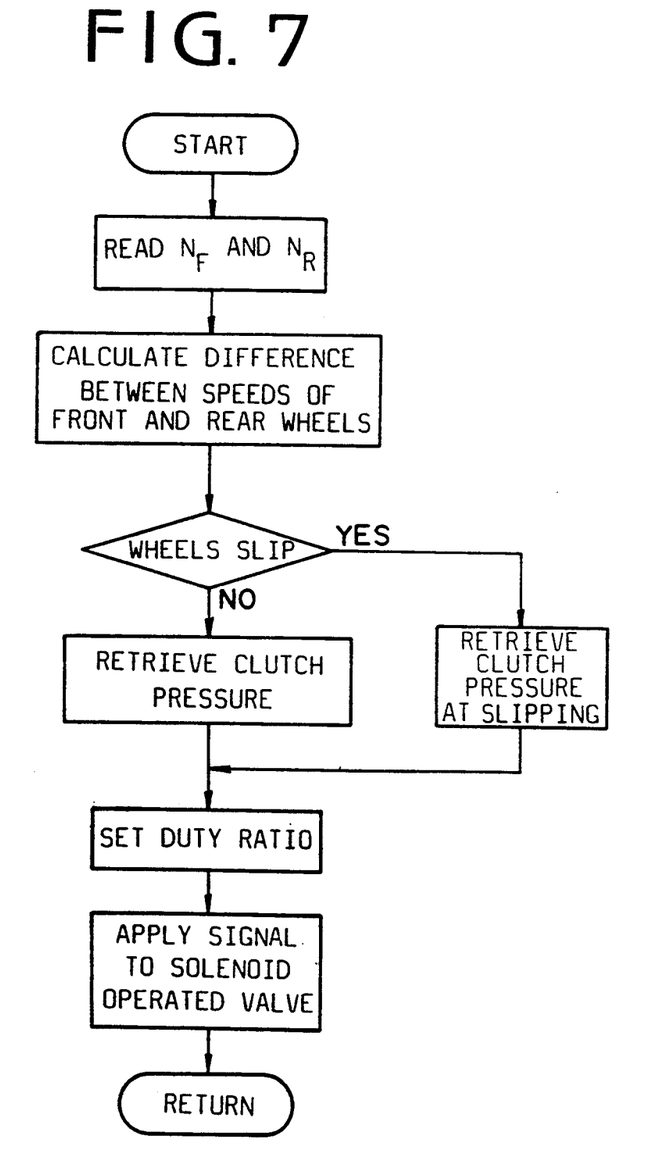
FIG. 7 is a flowchart showing the operation of a control unit in the control system.

FIG. 7 is a flowchart showing the operation of the control unit 90.

As aforementioned, the front-wheel speed $N_F$ and the rear-wheel speed $N_R$ are detected and slipping of the front wheels and rear wheels is calculated. If the slip ratio of rear wheels is smaller than a set value, a differential operation restricting clutch torque is derived from the look up table 96 in accordance with a throttle opening degree, vehicle speed, shift position and the steering angle. The duty ratio corresponding to the derived clutch torque is applied to the solenoid operated valve 87. When the slip ratio of the rear wheels is larger than the set value, a clutch torque is derived from the look up table 96 for operating the valve 87 at slipping.

Describing the operation of the system, the power of the engine 10 is transmitted through the clutch 13, the drive shaft 14, the sub transmission 15, and the input shaft 19 to the manual transmission 30 at which the transmission ratio is controlled. The output of the transmission is transmitted to the first sun gear 51 of the central differential 50 through the drive gear shaft 41. The front torque $T_F$ and the rear torque $T_R$ is determined in accordance with the radii of the gears of the central differential 50. The torque is transmitted to the carrier 55 at a ratio, for example 38% and to the second sun gear 53 at a ratio, for example 62%.

If a no slip state is detected in the control unit 90 while the vehicle is driven on the dry road, a signal corresponding to the duty ratio of 100% is applied from the duty ratio providing section 97 to the solenoid operated duty control valve 87. Thus, the clutch control pressure becomes zero and the clutch control valve 82 operates to close the passage 81a, thereby draining the oil from the clutch 60. The clutch 60 is disengaged and the clutch torque becomes zero so as to render the central differential 50 free.

Accordingly, the torque of the carrier 55 is transmitted to the front wheels through the front drive shaft 20 and the front differential 21 at the ratio 38%. The torque at distribution ratio of 62% is transmitted to the rear wheels through the second sun gear 53, the transfer shaft 22, the transfer gears 24 and 25, the rear drive shaft 23, the propeller shaft 26 and rear differential 27. Thus, a full-time four-wheel driving is established.

At the torque distribution ratio, the vehicle is driven under the understeer condition, so that good controllability of the vehicle is ensured. Further, the vehicle smoothly goes through a sharp corner owing to the differential operation of the central differential 50.

Figure 6A:
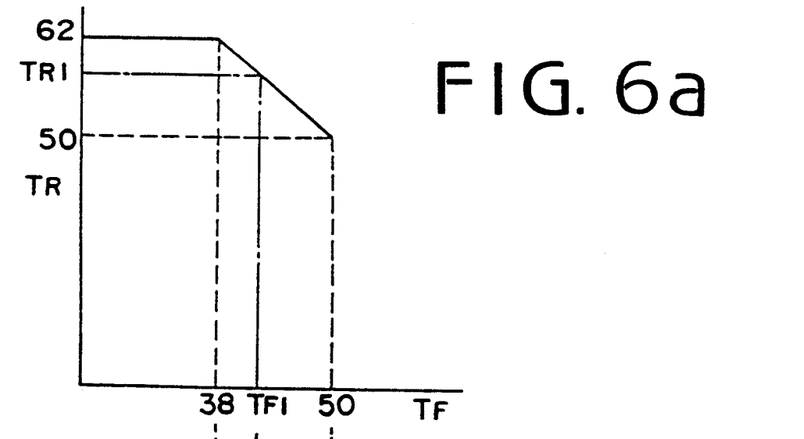
FIG. 6a is a graph showing a relationship between front torque and rear torque.
Figure 6B:
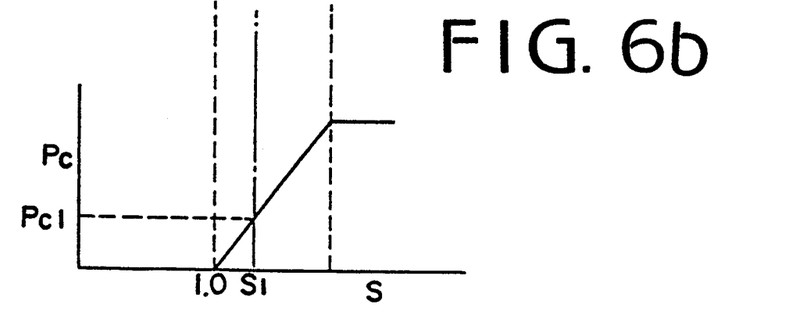
FIG. 6b is graph showing a characteristic of a clutch pressure in accordance with slip ratio.

If the vehicle is driven on a slippery road, the rear wheels slip first because the larger amount of torque is distributed to the rear wheels dependent on the standard torque distribution ratio. The slip ratio $S_1$ is calculated at the slip ratio calculator 94 of the control unit 90. The duty signal corresponding to clutch pressure $Pc_1$ in accordance with the slip ratio $S_1$ ($S<1$) is applied to the solenoid operated valve 87. The clutch control valve 82 is operated by the control pressure obtained by regulating the line pressure at the solenoid operated valve 87, so that the clutch 60 is engaged at the clutch pressure. Consequently, the clutch torque Tc is produced in the clutch 60. The clutch 60 is provided in parallel with the carrier 55 and the second sun gear 53 of the central differential 50. Accordingly, the clutch torque Tc is transmitted from the second sun gear 53 to the carrier 55 to increase the torque to the front wheels. To the contrary, the torque to the rear wheels is reduced to eliminate slipping, thereby improving controllability of the vehicle and safe driving. Thus, the distribution ratio of the front torque and the rear torque $T_F:T_R$ becomes $T_{F1}:T_{R1}$, respectively, as shown in FIG. 6.

When the slip ratio S becomes smaller than the set value SI, the differential operation restricting torque becomes maximum by the pressure of oil in the clutch 60. Thus, the carrier 55 is directly engaged with the second sun gear 53 to lock the central differential 50. Thus, the four-wheel driving is established in accordance with the torque distribution corresponding to the axle loads of the front and rear wheels. Thus, the torque distribution is continuously controlled in accordance with the slip condition for preventing slipping of the wheels.

When the vehicle makes a turn, the clutch torque of the clutch 60 is decreased in accordance with the steering angle $\psi$, so that the differential limit operation of the central differential 50 is decreased to sufficiently absorb the rotating difference in speeds of the front and rear wheels, thereby preventing the tight corner braking phenomena and ensuring good driveability.

Figure 8A:
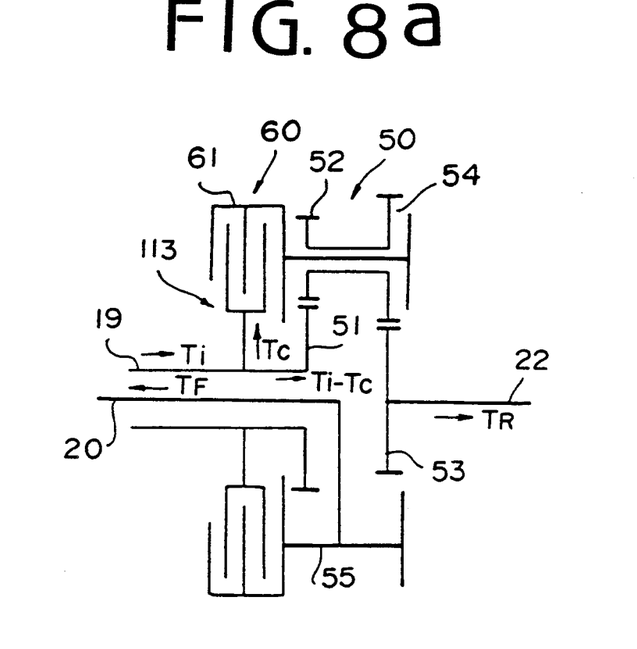
FIGS. 8a and 8b are schematic views showing other examples of the central differential.

FIG. 8a shows another example of the central differential. The fluid operated multiple-disk clutch 60 is disposed between the carrier 55 and the output shaft 19 of the transmission. Thus, a bypass system 113 comprising the clutch 60 is provided for the transmitting system from the output shaft 19 to the front drive shaft 20 and to the rear drive shaft 23 through the central differential 50. When the rear wheels slip, the speed difference in the central differential becomes as follows:

rear-wheel speed $N_R$ > speed of output shaft 19 > front-wheel speed $N_F$.

A part of the output torque of the output shaft 19 is directly transmitted to the front drive shaft 20 through the drive drum 61 of the clutch 60 and the carrier 55 in accordance with the clutch torque Tc. The remaining torque is transmitted to the carrier 55 and the rear drive shaft 23 from the first sun gear 51 dependent on the torque distribution ratio of the differential 50. The front-wheel torque $T_F$ and the rear-wheel torque $T_R$ are as follows.

$$T_F = 0.38(Ti - Tc) + Tc$$

$$T_R = 0.62(Ti - Tc)$$

Since the clutch torque Tc is zero in the no slip state, the torque distribution ratio of the front and rear wheels is $T_F:T_R = 38:62$. When the rear wheels slip to produce clutch torque Tc, a part of the input torque Ti corresponding to the clutch torque Tc is directly transmitted to the front wheels. The torque $T_F$ transmitted to the front wheels becomes large with the increase of the clutch torque Tc.

Figure 8B:
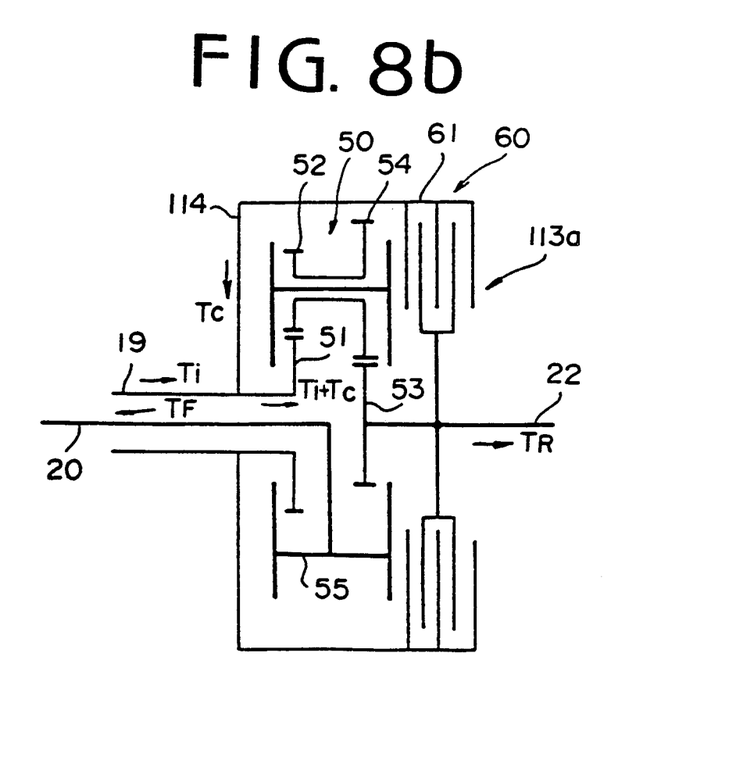

In the central differential of FIG. 8b, the output shaft 19 is provided with a transmitting member 114 extending therefrom and connected with the drum 61 of the clutch 60, consequently which houses the central differential 50. The multiple-disk clutch 60 is disposed between the second sun gear 53 and the output shaft 19. Thus, a bypass system 113a comprising the clutch 60 is provided for the output shaft 19. The front-wheel torque $T_F$ and the rear-wheel torque $T_R$ are as follows.

$$T_F = 0.38(Ti + Tc)$$

$$T_R = 0.62(Ti + Tc) - Tc$$

When the rear wheels slip, the torque based on the distribution ratio and the sum of the clutch torque Tc and the input torque Ti is transmitted to the front wheels.

In the system, the transfer shaft 22 can be integrated with the rear drive shaft 23 and provided coaxially with the output shaft of the transmission.

The system of the present invention can be applied to other types of four-wheel drive motor vehicle such as the type of the rear wheel drive vehicle with a rear engine.

In accordance with the present invention, the central differential comprises two pairs of sun gears and planetary pinions and a carrier. The torque distribution of the differential to front wheels and the rear wheels is determined by radii of the pitch circles of the gears and the pinions. Thus, the torque distribution ratio can be set to various values.

Accordingly, the system may be made to distribute larger torque to the rear wheels than that to the front wheels, without changing the size of the system. Since large torque is transmitted to the rear wheels, wide controlling of the torque distribution can be performed the fluid operated multiple-disk clutch mounted on the differential. Thus, controllability and driveability of the vehicle are accurately and properly attained, thereby improving efficiencies thereof.

The central differential and the fluid operated multiple-disk clutch are coaxially provided at the rear of the manual transmission in the small size. Thus, operations for the torque distribution and the differential lock are smoothly performed.

The front drive shaft mounted in the output shaft is connected to the central differential to simplify the construction. The torque to the rear wheels is distributed to the front wheels in accordance with the differential operation restricting torque of the clutch at slipping of the rear wheels, so that linear characteristics is provided.

Since the increase of the torque distribution to the front wheels is surely performed in accordance with the bypass system of the clutch, the differential limit operation has a good response.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for controlling torque distribution to front wheels and rear wheels of a motor vehicle having a manual transmission with an output shaft, the system comprising:

a planetary gear device including a first sun gear connected to said output shaft of said transmission, first and second planetary pinions integral with each other, a carrier provided to rotatably support said pinions and operatively connected to said front wheels, and a second sun gear operatively connected to said rear wheels;

said first planetary pinion being engaged with said first sun gear, and said second planetary pinion being engaged with said second sun gear;

means for selectively connecting said first sun gear and said carrier of said planetary gear device so as to restrict differential operations of said planetary gear device.

2. A system for controlling torque distribution to front wheels and rear wheels of a motor vehicle having a manual transmission with an output shaft, the system comprising:

a planetary gear device including a first sun gear connected to said output shaft of said transmission, first and second planetary pinions integral with each other, a carrier provided to rotatably support said pinions and operatively connected to said front wheels, and a second sun gear operatively connected to said rear wheels;

said first planetary pinion being engaged with said first sun gear, and said second planetary pinion being engaged with said second sun gear;

means for selectively connecting said first sun gear and said second sun gear of said planetary gear device so as to restrict differential operations of said planetary gear device.

* * * * *